United States Patent Office 3,438,764
Patented Apr. 15, 1969

3,438,764
STABLE FERTILIZER AMMONIATING SOLUTION AND METHOD OF MAKING SAID SOLUTION
Robert J. Church, Wilmington, Del., assignor to E. I. du Pont de Nemours and Company, Wilmington, Del., a corporation of Delaware
No Drawing. Continuation-in-part of application Ser. No. 304,268, Aug. 23, 1963. This application Aug. 30, 1965, Ser. No. 483,842
Int. Cl. C05c 9/02
U.S. Cl. 71—30      3 Claims

ABSTRACT OF THE DISCLOSURE

A fertilizer ammoniating solution is made by heating a composition nominally containing 12–26% ammonia, 17–41% urea, 16–36% formaldehyde, 14–29% water and 0–7% carbon dioxide, the mol ratio of urea to formaldehyde between 0.3:1 to 1:1, for a period of time to produce a crystallization temperature between 4° and −20° C.

---

This is a continuation-in-part of my copending application Ser. No. 304,268, filed Aug. 23, 1963, now abandoned.

This invention relates to fertilizer ammoniating solutions which are useful in the preparation of mixed fertilizers. It is more particularly directed to aqueous ammoniacal solutions containing urea and formaldehyde in molar ratios greater than about 0.3:1 but less than 1:1, the solutions having crystallization temperatures in the range of +4 and −20° C., and to processes for preparing such solutions.

In the manufacture of certain mixed fertilizers it is desirable that as much as possible of the total nitrogen content of the product be in a form which will supply nitrogen to the growing plants over a long period of time. Urea-formaldehyde polymers are a common, well-known and tested source of such nitrogen. An estimate of the amount of nitrogen in a urea-formaldehyde-containing mixed fertilizer which will be available to the growing plants over a long period of time can be obtained by a determination of the cold-water insoluble nitrogen content of the polymer. Cold water insoluble nitrogen, as used herein, is determined by the analysis procedure set out in paragraph 2.047 of "Official Methods of Analysis of the Association of Official Agricultural Chemists," ninth edition, 1960.

Cold water insoluble nitrogen in the form of urea-formaldehyde polymers is usually obtained in mixed fertilizers by adding to an acidic substrate, such as a superphosphate, a solution containing urea and a source of formaldehyde. When the solution contacts the acidic dry fertilizer ingredients, a condensation reaction is triggered to form the solid urea-formaldehyde polymer in situ in the mixture. This method has heretofore suffered from the disadvantage that it has not been possible to develop adequate amounts of urea-formaldehyde polymer on the substrate, the limiting factor being the tolerable concentration of formaldehyde in the ammoniating solution. In the preparation of ammoniating solutions containing urea, ammonia, formaldehyde, and water it has been necessary that the concentrations of formaldehyde be maintained below certain maximum values in order to avoid the formation at normal operating and storage temperatures of insoluble precipitates consisting either of crystalline hexamine (hexamethylenetetramine) or flocculent urea-formaldehyde polymers. Due to the insufficient amount of formaldehyde in the ammoniating solution, it has been possible to form cold water insoluble nitrogen of good quality in situ in the form of urea-formaldehyde polymer only to the extent of about 35% of the total nitrogen present. Using the ammoniating solutions disclosed in this application, it is possible to prepare mixed fertilizers containing as much as 50% or more of the total nitrogen as cold-water insoluble urea-formaldehyde polymer of good agronomic value. Good agronomic value means that the Activity Index of the polymer is 40 or greater as described by the procedure given in paragraph 2.053 of the "Official Methods of Analysis of the Association of Official Agricultural Chemists," vol. 44–1, page 134.

A further advantage of the solutions of this invention lies in the fact that they exhibit extremely low crystallization temperatures in the range of +4 and −20° C. Thus, observance of special precautions to prevent formation of precipitates during storage and handling are not ordinarily necessary.

The fertilizer ammoniating solutions of this invention have nominal compositions within the following range:

| | Percent |
|---|---|
| Urea | 17–41 |
| Formaldehyde | 16–36 |
| Ammonia | 12–26 |
| Water | 14–29 |
| Carbon dioxide | 0–7 |

The percentages listed are percentages by weight based on the total weight of the solutions. In addition, the urea to formaldehyde ratios in the solutions are greater than about 0.3:1 but less than about 1:1, and the crystallization temperatures of the solutions are between about +4 and −20° C. The preferred solutions are those which contain a maximum of about 22% water. Especially preferred are solutions which contain a maximum of 22% water, have a urea to formaldehyde ratio of at least 0.4:1 and have a crystallization temperature between about −10 and 20° C.

It will be understood that the term "nominal composition" is used herein to indicate that the species listed may be present as such in the products or they may be present in whole or in part in chemical combination with other species. For example, ammonia will be present at least in part in combination with formaldehyde to provide hexamethylenetetramine. Formaldehyde will combine in part with ammonia to provide hexamethylenetetramine and also with urea to provide low molecular weight methylol ureas. Water is produced when hexamethylenetetramine is formed from ammonia and formaldehyde, and will augment the amount of water present at the start of the reaction. The carbon dioxide, if present, will of course be combined with ammonia as ammonium carbamate. To further explain the effect of the hexamethylenetetramine reaction on the nominal composition, an example is given below in which the composition of a special solution is expressed in both "nominal" and "equivalent hexamethylenetetramine" values.

| | Nominal concentration, wt. percent | Equivalent hexamethylenetetramine concentration, wt. percent |
|---|---|---|
| Urea | 33.3 | 33.3 |
| Formaldehyde | 35.5 | |
| Ammonia | 14.5 | 1.1 |
| Hexamethylenetetramine | | 27.6 |
| Water | 16.7 | 38.0 |

Similarly, the formation of an equivalent amount of methylol urea from urea and formaldehyde will affect the "equivalent concentration" but not the "nominal concentrations."

It will be observed that the mol ratio of urea to formaldehyde in the solutions is greater than about 0.3:1 but less than 1:1. This means that when urea is present in the solutions in the amount of about 41% by weight, the minimum amount of formaldehyde will be about 21% so as to provide a mol ratio less than about 1:1. If the amount of formaldehyde is lower than about 21%, then the amount of urea will be correspondingly lower than 41%. Similarly, when urea is present in the amount of 17% by weight, the maximum amount of formaldehyde will be about 30% so as to provide a mol ratio greater than about 0.3 to 1. If the amount of formaldehyde is greater than 30% then the amount of urea will of course be correspondingly greater than 17%.

The solutions of the invention are prepared by mixing the ingredients in the proper proportions under conditions such that the mixture will reach a temperature in the range of about 150 to 300° F. and maintaining the mixture at this temperature for a time sufficient to produce a solution having a crystallization temperature in the range of +4 and −20° C.

The requisite temperature may be provided by exothermic heat of reaction between ammonia and formaldehyde when these are mixed in their free forms. For example, an aqueous ammoniacal solution of urea can be added to a solution containing urea, formaldehyde and water in the proper proportions to provide solutions having nominal compositions within the ranges specified for this invention. Upon this addition, an almost instantaneous exothermic reaction occurs between the ammonia and formaldehyde to provide hexamethylenetetramine and causing the temperature of the mixture to rise to 200–250° F. No precipitation occurs and upon cooling, the solution is found to have a crystallization temperature between about +4 and −20° C. The clear aqueous solution will remain stable for prolonged periods of storage.

It should be observed that when this method of preparing the solutions is followed, the order of mixing the ingredients is important. Thus the urea-ammonia-water solution should be added to the urea-formaldehyde-water solution. Reversing the order of addition results in formation of insoluble urea-formaldehyde condensation products which cannot be eliminated by heating.

The urea-ammonia-water solution can be added to the urea-formaldehyde-water solution in a closed vessel as in a batch process, or if desired two streams of the starting solutions can be fed simultaneously with comingling of the streams into a reaction zone as in a continuous process. Such a continuous process is illustrated in Examples 13–15 below.

Of course, this method of preparation is not limited to the addition of urea-ammonia-water solutions to urea-formaldehyde-water solutions. Other combinations can be used. For example anhydrous or aqueous ammonia can be added to a solution containing urea, formaldehyde and water, or a urea-ammonia-water solution can be added to a formaldehyde-water solution. The possible combinations will be apparent to those skilled in the art. In general it can be said that the process involves adding ammonia or a solution containing ammonia to formaldehyde or a solution containing formaldehyde in the presence of urea. The urea may be mixed with either the ammonia or the formaldehyde or both, or it may be added separately, simultaneously with the addition of ammonia. The water of course may be added in any convenient manner; all of the ingredients can be added as water solutions.

As an alternative, the solutions may be prepared by mixing the preformed reaction product of formaldehyde and ammonia, hexamethylenetetramine, with urea and water and, if desired, excess ammonia. In this method, the order of adding materials is immaterial. The heat necessary to provide solutions having crystallization temperatures in the range of +4 and −20° C. can be applied by external application after mixing or as sensible heat of one or more of the ingredients.

Thus, for example, solid hexamethylenetetramine or a solution of hexamine in water can be added to an autoclave with urea, water, and free ammonia and heated to a temperature of about 150–300° F. until a solution having a crystallization temperature in the range of +4 and −20° C. is obtained. This procedure is illustrated in the examples which follow.

As a further variation an aqueous hexamethylenetetramine solution can be added to a urea-ammonia-water solution and additional urea, either in solid form or as an aqueous solution can be introduced and the mixture heated in an autoclave to obtain a clear stable solution having a crystallization temperature in the range specified for the solutions of the invention. This procedure is illustrated in Example 8 below.

As a still further exemplification, an aqueous hexamethylenetetramine solution can be blended with molten urea or a hot concentrated solution of urea and water. If desired, excess ammonia can be added to meet the ammoniation requirements of a given acidic fertilizer substrate. Since the urea or urea-water solution is hot when blended with the hexamine solution, no further heating is required to produce an ammoniating solution having a crystallization temperature below +4° C., although some additional heating may be used if desired to provide a crystallization temperature in the lower part of the range +4 and −20° C. This procedure is illustrated in Example 9 below.

In commercial operations, a convenient source of urea-ammonia-water solutions is an effluent from the pressure reaction of carbon dioxide and ammonia to form urea. Such an effluent stream will ordinarily contain carbon dioxide in the form of ammonium carbamate, as well as urea, water and free ammonia. Although the effluent stream can be treated to remove the ammonium carbamate, this is not necessary in order to produce ammoniating solutions within the scope of this invention which may contain up to 7% carbon dioxide as ammonium carbamate without unduly affecting the crystallization temperature.

Important economies in the commercial manufacture of these solutions can be realized by use of a synthesis effluent stream without prior treatment to remove carbon dioxide.

It will be understood, however, that as the carbon dioxide content in the solutions increases to the maximum, the water content should increase correspondingly in order to provide clear solutions with crystallization temperatures below +4° C. Preferably, the solutions contain no more than about 3.5% by weight $CO_2$ in order to provide desirably low crystallization temperatures. When larger amounts of $CO_2$ are present the water content should preferably be above about 20%.

A typical urea synthesis effluent containing urea, ammonia, ammonium carbamate, and water, can be used to produce the solutions of this invention by either of the two general methods outlined above. Thus, a synthesis effluent can be added to a source of formaldehyde, such as an aqueous urea-formaldehyde solution or an aqueous formaldehyde solution, in which case the ammonia in the effluent reacts exothermically with the formaldehyde to produce the heat necessary for obtaining a solution having a low crystallization temperature. Alternatively, the urea synthesis effluent can be blended with hexamethylenetetramine, either in solid form or as an aqueous solution, and the mixture can be heated to provide a clear aqueous solution. If desired additional urea can be added during the blending step to provide a solution having a urea-formaldehyde mol ratio near 1:1.

Examples illustrating the use of urea synthesis effluent containing carbon dioxide as ammonium carbamate appear below.

Of, course, ammonium carbamate can also be added as a separate ingredient in either of the two general methods for preparing the solutions of this invention, as illustrated in Examples 10 and 17 below, but there is no particular advantage in doing this. The ammonium carbamate is not a particularly desirable ingredient of the solutions, but its presence can be tolerated and any advantage gained in removing the carbamate from the starting urea synthesis effluents does not justify the cost of the treatment.

As discussed above the solutions of the invention may conveniently be prepared by adding urea-ammonia-water solutions, which may also contain carbon dioxide, to aqueous solutions containing urea, formaldehyde, and water. The proportions of the two solutions to be mixed will, of course, be dependent upon the compositions of the starting solutions and the desired composition of the final solution. The proper proportions can be easily determined by calculating in a given instead.

Ordinarily in practicing this method, the urea-ammonia solution will contain betwen about 35 and 58% urea, 27 and 48% ammonia, 14 and 30% water, and from 0 to about 12% carbon dioxide. The urea-formaldehyde solution will contain between about 50 and 60% formaldehyde, 25 and 37.5% urea, and 12.5 and 15% water.

In blending such solutions the weight ratio of the first solution to the second solution will range from about 0.3:1 to about 3:1. With a ratio lower than about 0.3:1, there is insufficient ammonia in the resulting solutions. With a ratio higher than about 3:1 the urea to formaldehyde ratio in the resulting solutions will be above 1:1.

The compositions of this invention prepared by either of the two general "heat treatment" methods above described are such that additional ammonia or urea or both can be added without causing precipitation of hexamethylenetetramine or other flocculant or crystalline precipitates at normal temperatures of use. The amount of urea added of course should be no more than that required to bring the urea to formaldehyde ratio of the solution up to about 1:1. Similarly, additional ammonia can be added if desired in order to meet the ammoniation requirements of various acidic substrates.

As discussed above the extraordinarily low crystallization temperatures of the solutions of this invention are primarily the result of the heat treatment. The necessary heat for this treatment is supplied by the exothermic reaction of ammonia and formaldehyde or by sensible heat of the starting materials or by external application of heat to the final solutions or by a combination of these sources.

Although applicant does not wish to be bound by any particular theory, it is believed that this heat treatment induces hydrolysis of a portion of the hexamine in the alkaline solutions and the reaction of the liberated formaldehyde with urea to form soluble low molecular weight methylol ureas.

In general, the heat treatment may be carried out in the range of 150° to 300° F. Higher temperatures can be used but are not necessary.

As will be obvious to those skilled in the art, the time and temperature are corelated variables. As temperature increases, the time necessary to produce a given decrease in crystallization temperature in a solution also decreases. In general it can be said that the period of heat treatment should range from 1.5 minutes to 6 hours depending upon the temperature of the heat treatment and the desired crystallization temperature of the final solution. Ordinarily, the crystallization temperature of a given solution will continue to drop as the time of heating at a given temperature is increased. However, it is believed that prolonged heating will eventually result in a rise in crystallization temperature. The reason for this is not understood at present. The optimum time and temperature of heating a given solution to provide a desirably low crystallization temperature can best be determined in each case by simple experimentation. In the examples which follow there are illustrated suitable heat treatment conditions for guidance of those skilled in the art in practicing this invention.

The clear, stable solutions of low crystallization temperature described above are highly useful where it is desired to produce a mixed fertilizer employing a single ammoniating solution. It should be observed, however, that it is also possible, and sometimes preferable, to mix formaldehyde with ammonia and urea just prior to introduction of the ammoniating mixture into the dry fertilizer ingredients. Thus, for example, a urea-formaldehyde-water solution of the type described and a urea-ammonia-water solution (which may optionally contain other ingredients such as ammonium carbamate, ammonium phosphate, ammonium sulfate and the like) can be comingled immediately prior to mixing with the other fertilizer ingredients where all are in a fertilizer ammoniator. Upon admixture of the streams of course an exothermic reaction takes place between the ammonia and formaldehyde which raises the temperature of the system. It is believed that the system is in a metastable and highly reactive state and that introduction of the admixture into the other fertilizer ingredients before it has started to cool results in maximum development of urea-formaldehyde polymer of high agronomic value.

In this case, the proportions of ingredients are not important, since it is not necessary that the mixture result in a stable, clear solution. This method thus offers complete flexibility to the fertilizer manufacturer in the urea-formaldehyde polymer content available. An illustration of the preparation of a mixed fertilizer using this method is given in Example 23 below.

Percentages given in the examples which follow are by weight, based on total weight of the solutions.

Example 1

To 26.7 grams of a 60% formaldehyde, 25% urea, 15% water solution occupying a closed container is added with agitation, 18.3 grams of a solution consisting of 35.5% anhydrous ammonia, 45.4% urea, and 19.1% water which is previously prepared in a closed container at 70° F. The pressure within this latter solution increases to 50 pounds per square inch gage as a result of free ammonia.

Immediately upon this addition, the temperature of the reactants rises to 202° F. Following the addition and reaction steps, the resulting solution is cooled to about 85° F. by placing the closed container in an ice bath.

The resulting ammoniacal-urea-formaldehyde solution is clear and free of precipitates. Upon storage for three months at 0° C. the solution remains clear with no visible precipitation of solids.

Lowering the temperature of the solution to about −30° C. and then gradually raising the temperature for dissolution of the crystals formed shows that the crystallization temperature, i.e., the temperature at which the last solids formed upon freezing go back into solution, is 0° C.

Analysis of the solution prepared shows the following percentage by weight composition:

| | Percent |
|---|---|
| Urea | 33.3 |
| $NH_3$ | 14.5 |
| $CH_2O$ | 35.5 |
| $H_2O$ | 16.7 |
| | 100.0 |

Total nitrogen 27%.

Adding more of the ammonia urea solution as above prepared to the final composition above results in a continued clear solution without formation of any precipitates.

Example 2

The composition of Example 1 is prepared continuously by simultaneously feeding the contents from the two closed containers, one of which contains 1056 grams of the urea-formaldehyde solution of Example 1 and the other 732 grams of the ammonia-urea-solution of Example 1, each pressurized to 75 p.s.i.g., into a single pipeline leading to a third container.

Seven minutes are required to add the contents of the two containers together and fill the third container. The resulting solution in the third container obtains a temperature of 243° F. and is under a pressure of 26 p.s.i.g.

Upon cooling of the liquid product to a temperature of about 80° F. it remains clear and free from precipitate. The crystallization temperature, found in the manner of Example 1, is −4° C.

Example 3

The composition of Example 1 is prepared by admixing in a closed container the following components:

|  | Grams |
|---|---|
| Urea | 33.3 |
| Hexamethylenetetramine | 27.7 |
| $H_2O$ | 35.0 |
| Aqua ammonia (29% $NH_3$) | 4.0 |

The container is sealed and the above contents are heated at 165° F. for 15 minutes. Following the heating, the contents are cooled to about 78° F. by placing the container in an ice bath.

The resulting solution is clear and free of precipitates even after storage at +4° C. for a period of 3 months.

The crystallization temperature is found to be +2° C.

Example 4

To 26.7 grams of a 60% formaldehyde, 25% urea, 15% water solution in a closed container is added with agitation, 23.2 grams of a solution consisting of 47.8% anhydrous ammonia, 35.8% urea and 16.4% water which is previously prepared in a closed container at 70° F. The pressure within this latter solution increases to 65 pounds per square inch gage as a result of free ammonia.

Immediately upon this addition, the temperature of the reactants rises to 277° F. Following the addition and reaction steps, the resulting solution is cooled to about 85° F. by placing the closed container in an ice bath.

The resulting ammoniacal-urea-formaldehyde solution is clear and free of precipitates. Upon storage for five months at −2° C. the solution remains clear with no visible precipitation of solids.

Lowering the temperature of the solution to about −30° C. and then gradually raising the temperature for dissolution of the crystals formed shows that the crystallization temperature is −6° C.

Analysis of the solution prepared shows the following percentage by weight composition:

|  | Percent |
|---|---|
| Urea | 30.2 |
| $NH_3$ | 22.3 |
| $CH_2O$ | 32.3 |
| $H_2O$ | 15.2 |
|  | 100.0 |

Example 5

To 26.7 grams of a 60% formaldehyde, 25% urea, 15% water solution in a closed container is added with agitation, 54.9 grams of a solution consisting of 45.4% anhydrous ammonia, 35.5% urea and 19.1% water which is previously prepared in a closed container at 68° F. The pressure within this latter solution increases to 63 pounds per square inch gage as a result of free ammonia.

Immediately upon this addition, the temperature of the reactants rises to 232° F. Following the addition and reaction steps, the resulting solution is cooled to about 80° F. by placing the closed container in an ice bath.

The resulting ammoniacal-urea-formaldehyde solution is clear and free of precipitates. Upon storage for six months at 0° C., the solution remains clear with no visible precipitation of solids.

Lowering the temperature of the solution to about −30° C. and then gradually raising the temperature for dissolution of the crystals formed shows that the crystallization temperature is −3° C.

Analysis of the solution prepared shows the following percentage by weight composition:

|  | Percent |
|---|---|
| Urea | 38.8 |
| $NH_3$ | 24.1 |
| $CH_2O$ | 19.6 |
| $H_2O$ | 17.5 |
|  | 100.0 |

Example 6

To 26.7 grams of a 60% formaldehyde, 25% urea, 15% water solution in a closed container is added with agitation 23.6 grams of a solution consisting of 27.5% anhydrous ammonia, 57.6% urea and 14.9% water which is previously prepared in a closed container at 70° F. The pressure within this latter solution increases to 45 pounds per square inch gage as a result of free ammonia.

Immediately upon this addition, the temperature of the reactants rises to 214° F. Following the addition and reaction steps, the resulting solution is cooled to about 75° F. by placing the closed container in an ice bath.

The resulting ammoniacal-urea-formaldehyde solution is clear and free of precipitates. Upon storage for 3 months at +2° C. the solution remains clear with no visible precipitation of solids.

Lowering the temperature of the solution to about −30° C. and then gradually raising the temperature for dissolution of the crystals formed shows that the crystallization temperature is 0° C.

Analysis of the solution prepared shows the following percentage by weight composition:

|  | Percent |
|---|---|
| Urea | 40.5 |
| $NH_3$ | 12.9 |
| $CH_2O$ | 31.7 |
| $H_2O$ | 14.9 |
|  | 100.0 |

Example 7

An ammoniacal solution of the identical percentage by weight composition to that prepared in Example 6 above and which has identical physical characteristics can also be prepared as follows:

To 32.0 grams of a 50% formaldehyde, 37.5% urea, 12.5% water solution in a closed container is added with agitation, 18.3 grams of a solution consisting of 35.5% anhydrous ammonia, 45.4% urea and 19.1% water which is previously prepared in a closed container at 70° F. The pressure within this latter solution increases to 100 pounds per square inch gage as a result of free ammonia.

Immediately upon this addition, the temperature of the reactants rises to 255° F. Following the addition and reaction steps, the resulting solution is allowed to cool to room temperature upon standing.

Example 8

Fifty parts of a 45% aqueous hexamethylenetetramine solution are blended in an autoclave with 25 parts of an aqueous urea solution containing 70% urea and 25 parts of a typical urea synthesis effluent containing 43.3% urea, 17.7% ammonium carbamate, 16.2% water and 22.8% ammonia. The mixture is heated at a temperature of 250° F. for 1½ hours. The resulting clear solution has the following nominal composition:

|  | Percent |
|---|---|
| Urea | 28.5 |
| Formaldehyde | 28.3 |
| Ammonia | 12.7 |
| Water | 22.0 |
| Carbon dioxide | 2.5 |

The urea-formaldehyde mol ratio in this solution is approximately 0.5:1 and the crystallization temperature is less than 0° C.

Example 9

Thirty-seven and four-tenths parts of a hot urea melt consisting of 90.0% urea in water are blended with 61.5 parts of 45% aqueous hexamethylenetetramine solution and 1.1 parts of anhydrous ammonia in a closed container. The hot urea melt contains sufficient heat to provide a solution having a crystallization temperature below +4.0° C. Further heating to a temperature of 250° F. for a period of 15 minutes lowers the crystallization temperature still further, to below 0° C.

The nominal composition of the solution of this example is:

| | Percent |
|---|---|
| Urea | 33.3 |
| Formaldehyde | 35.5 |
| Ammonia | 14.5 |
| Water | 16.7 |

Example 10

A solution is prepared by blending in a closed container 29.5 parts solid urea, 25.5 parts solid hexamethylenetetramine, 5.5 parts of 29% aqua ammonia, 37.6 parts water, and 5.8 parts solid ammonium carbamate. The solution as made has a crystallization temperature of 43° F. (about 6° C.). Heating this solution at a temperature of 210° F. for five minutes decreases the crystallization temperature to 33° F. Continuing the heat treatment at this temperature for 4 hours reduces the crystallization temperature to about 1° F. (about −17° C.). The nominal composition of the solution is:

| | Percent |
|---|---|
| Urea | 29.5 |
| Formaldehyde | 32.8 |
| Water | 17.9 |
| Ammonia | 16.5 |
| Carbon dioxide | 3.3 |

The mol ratio of urea to formaldehyde in this solution is 0.45:1.

Example 11

A 10-6-4 grade mixed fertilizer is prepared by adding in a conventional fertilizer blender 355 pounds of the solution of Example 8 above along with 155 pounds of a 45% urea solution to 1592 pounds of fertilizer ingredients consisting of:

| Component: | Wt. lbs. |
|---|---|
| Ammonium sulfate | 150 |
| Normal superphosphate (20% $P_2O_5$) | 600 |
| Sulfuric acid (60° Bé.) | 133 |
| Potassium chloride | 134 |
| Dolomite | 375 |
| Vermiculite | 200 |

The resulting mixed fertilizer after storage for 10 days at 150° F. contains over 50% of its total nitrogen as cold water insoluble urea formaldehyde polymer. The polymer in the fertilizer exhibits an Activity Index in excess of 40.

Example 12

A 10-6-4 grade mixed fertilizer is prepared by adding 282 pounds of the solution of Example 9 along with 160 pounds of 45% urea solution to 1590 pounds of the following fertilizer ingredients:

| | |
|---|---|
| Ammonium sulfate | 250 |
| Normal superphosphate (20% $P_2O_5$) | 600 |
| Sulfuric acid (60° Bé.) | 41 |
| Potassium chloride | 134 |
| Dolomite | 365 |
| Vermiculite | 200 |

After 10 days' storage at 150° F. the resulting fertilizer product contains over 50% of its total nitrogen as cold water insoluble urea-formaldehyde polymer of excellent quality.

Example 13

A fertilizer ammoniating solution is prepared continuously using the following two solutions as starting materials:

No. 1

| | Percent |
|---|---|
| Urea | 25 |
| Formaldehyde | 60 |
| Water | 15 |

No. 2

| | Percent |
|---|---|
| Urea | 45.4 |
| Ammonia | 35.5 |
| Water | 19.1 |

The two solutions are introduced continuously into 2 legs of a mixing T. Weight ratio of solution No. 1 to solution No. 2 is 1.456. The mixture is then led to an insulated, tubular reactor. Residence time in the reactor is 7 minutes and the reaction temperature is maintained at 195 to 215° F. The solution is then cooled to room temperature.

The nominal composition of the solution is ammonia 14.5%, urea 33.3%, formaldehyde 35.5%, and water 16.7%. The nominal urea to formaldehyde mol ratio is 0.47:1.

Actual analysis shows the product to contain 27.4% total nitrogen, 3.0% ammoniacal nitrogen, 21.4% hexamethylenetetramine, 22.2% urea, and 35% water. The solution is clear and has a crystallization temperature of −16° C.

Example 14

Example 13 is repeated, except that the weight ratio of solution No. 1 to solution No. 2 is 1.314.

The nominal composition of the product is ammonia 15.3%, urea 34%, formaldehyde 34.2%, and water 16.8%. The nominal mol ratio of urea to formaldehyde is 0.5:1.

The crystallization temperature of the solution is −12° C.

Example 15

Example 13 is repeated, except that the weight ratio of solution No. 1 to solution No. 2 is 1.638.

The nominal composition of the product is 32.7% urea, 37.4% formaldehyde, 13.4% ammonia, and 16.5% water. The nominal urea to formaldehyde mol ratio in this product is 0.44:1.

The crystallization temperature of this solution is −13° C.

Example 16

Example 13 is repeated, except that the weight ratio of solution No. 1 to solution No. 2 is 1.381 and the residence time in that reactor is 1.6 min.

The nominal composition of the product is 33.6% urea, 14.9% ammonia, 34.8% formaldehyde, and 16.7% water. The nominal urea to formaldehyde mol ratio in this product is 0.48.

The crystallization temperature of this solution is −17° C.

Example 17

An ammoniating solution is prepared by mixing in a pressure flask 33.24 parts urea, 27.54 parts hexamethylenetetramine, 38.00 parts water and 1.22 parts ammonia.

The mixture is heated at 100° C. for 33 minutes, then cooled to room temperature. The maximum pressure developed during the heating cycle is 27.0 p.s.i.g.

The nominal composition of this solution is approximately urea 33.3%, ammonia 16.7%, formaldehyde 35.5% and water 16.7%, with a nominal urea to formaldehyde mol ratio of 0.47:1.

Actual analysis of the product indicates the presence of 31.2% free urea and 1.45% free ammonia. Crystallization temperature of the solution is —5° C. Crystallization temperature of the mixture before heating is +12° C.

Additional clear solutions are obtained when the reaction time at 100° C. is either shorter or longer than 33 minutes, but in either case the crystallization temperatures are higher than —5° C.

Similarly, clear solutions are also obtained at reaction temperatures of 90 and 95° C., but these temperatures require longer reaction time for an equivalent drop in crystallization temperature.

Example 18

A solution is prepared by mixing 33.3 parts urea, 27.6 parts hexamethylenetetramine, 38.0 parts water and 1.1 parts ammonia, and passed through a pipeline heater. The residence time in this heater was 5.2 min. and the solution was heated to 205° F. The solution was cooled rapidly to room temperature.

After this heat treatment the product was clear and had a crystallization temperature of —18° C. Actual analysis indicated the presence of 28.1% total nitrogen, 3.6% free ammonia, 24.3% urea and 23.1% hexamethylenetetramine.

Example 19

Urea, 28.6 grams, hexamine, 28.0 grams, ammonium carbamate, 4.6 grams, and water 38.8 grams are mixed in a stoppered flask and heated to 95° C. for 1 hour in a steam bath. When cooled crystals begin forming in the solution at 30° C. The flask is then placed in an oil bath and the mixture is heated at 125° C. for 15 minutes. After this heat treatment the solution has a crystallization temperature of —5° C.

The nominal composition of this solution is:

| | Percent |
|---|---|
| Ammonia | 15.6 |
| Urea | 28.6 |
| Formaldehyde | 36.0 |
| Water | 17.2 |
| Carbon dioxide | 2.6 |

The mol ratio of urea to formaldehyde in this solution is 0.4:1.

Example 20

Sixty parts of a 36% hexamethylenetetramine solution are blended with 40 parts of a urea synthesis effluent containing 43.3% urea, 17.7% ammonium carbamate, 16.2% water, and 22.8% ammonia. The solution after heating for 10 hours at 196° F. has a crystallization temperature of about —16° C. The nominal composition of this solution is:

| | Percent |
|---|---|
| Ammonia | 22.5 |
| Urea | 17.5 |
| Formaldehyde | 27.6 |
| Water | 28.4 |
| Carbon dioxide | 4.0 |

Example 21

To 100 grams of the solution prepared as in Example 1 are added 13.3 grams of ammonium carbamate and 10 grams of water. The solution is heated at 190° F. for 3 hours. The resulting solution has a crystallization temperature of less than 0° C. and a nominal composition as follows:

| | Percent |
|---|---|
| Urea | 27.0 |
| Formaldehyde | 28.8 |
| Ammonia | 16.5 |
| Water | 21.6 |
| Carbon dioxide | 6.1 |

Example 22

A solution having the nominal composition:

| | Percent |
|---|---|
| Urea | 33.4 |
| Formaldehyde | 16.0 |
| Ammonia | 22.5 |
| Water | 21.4 |
| Carbon dioxide | 6.7 | is prepared by blending in a laboratory flask 12.3 grams of hexamine, 33.4 grams of urea, 11.5 grams of ammonia, 31 grams of water and 11.8 grams of ammonium carbamate.

A rubber stopper is inserted into the flask and the flask is placed into an oil bath and heated. When the temperature of the mixture reaches about 95° C. the last crystals go into solution.

The temperature of the solution is then raised to 110° C. and held there for 8 minutes, at which point pressure begins building up in the flask. The flask is then removed from the oil bath and the contents are cooled in an ice bath to a temperature below 0° C. until crystals have formed.

Upon reheating it is found that the last crystals go into solution at a temperature of +2° C.

Example 23

A 20-10-5 grade fertilizer is prepared according to the following procedure:

Dry fertilizer ingredients are introduced into an ammoniator in the following proportions:

| | Pounds |
|---|---|
| Urea, 46% N | 389 |
| Ammonium sulfate, 20.5% N | 365 |
| KCl, 60% $K_2O$ | 167 |
| Lightweight type filler | 298 |

316 lbs. of a solution composed of 60% formaldehyde, 25% urea, and 15% water is then comingled with 217 lbs. of a solution composed of 45.4% urea, 35.5% ammonia, and 19.1% water by introducing each solution into 2 legs of a mixing T situated in the ammoniator. The result of the comingling of these two liquid reactants is an exothermic reaction which is conducive to rapid formation of the urea-formaldehyde condensation products.

The ammoniating mixture leaving the mixing T flows through a sprayer and is sprayed onto the dry ingredients in the ammoniator. 369 lbs. $H_3PO_4$ (54.5% $P_2O_5$) is introduced separately but simultaneously with the ammoniating ingredients. In another run, the acid is premixed with the ammoniating mixture and the single composition is used to produce a 20-10-5 grade fertilizer.

The invention claimed is:

1. A stable fertilizer ammoniating solution having a mol ratio of urea to formaldehyde less than 1:1 but greater than about 0.3:1 and a crystallization temperature being between +4° and —20° C. being made by adding ammonia to formaldehyde with urea and water to provide a nominal composition of 12 to 26% by weight ammonia, 16 to 36% by weight of formaldehyde, 17 to 41% by weight urea, 14 to 29% by weight water, and 0 to 7% carbon dioxide, and maintaining the mixture at a temperature of 150° to 300° F. for a period of time to produce the stable solution having said crystallization temperature.

2. The stable fertilizer ammoniating solution of claim 1 having a mol ratio of urea to formaldehyde of 0.47:1 and a crystallization temperature between +4° and —20° C. and a nominal composition of 33.3% by weight urea, 35.5% by weight formaldehyde, 14.5% by weight ammonia and 16.7% by weight water.

3. In the process for making mixed fertilizers containing a urea-formaldehyde polymer source of nitrogen by combining urea and formaldehyde with dry acidic fertilizer substrates with mineral acid and ammonia, the improvement which comprises comingling a stream containing about 35–58% urea, about 27–48% ammonia, about 14–

30% water and about 0–12% carbon dioxide with a stream containing aobut 50–60% formaldehyde, about 25–37.5% urea and about 12.5–15% water and immediately thereafter adding the resulting mixture to the dry fertilizer ingredients.

References Cited

UNITED STATES PATENTS

| | | | |
|---|---|---|---|
| 2,002,672 | 12/1965 | Knishkern et al. | 71—9 |
| 2,033,718 | 3/1936 | Kraus | 260—3 |
| 2,093,364 | 9/1937 | Pollack | 260—3 |
| 2,255,026 | 9/1941 | Keenen et al. | 71—27 |
| 2,255,027 | 9/1941 | Keenen et al. | 71—27 |
| 2,279,200 | 4/1942 | Keenen | 71—29 |
| 3,022,153 | 2/1962 | Miller | 71—29 |
| 3,092,486 | 6/1963 | Waters et al. | 71—30 |
| 3,183,200 | 5/1965 | Hewson | 260—29.4 |

OTHER REFERENCES

V. Sauchelli: Chemistry and Technology of Fertilizers, No. 148, ACS Monograph Series, Rheinhold Publishing Corp., New York, 1960 (p. 45–47 relied on).

DONALL H. SYLVESTER, *Primary Examiner.*

R. D. BAJEFSKY, *Assistant Examiner.*

U.S. Cl. X.R.

71—29; 260—69, 70